(12) United States Patent
Jia et al.

(10) Patent No.: US 9,535,203 B2
(45) Date of Patent: Jan. 3, 2017

(54) BACK LIGHT UNIT AND DISPLAY DEVICE

(71) Applicants: BOE Technology Group Co., Ltd., Beijing (CN); Beijing BOE Display Technology Co., Ltd., Beijing (CN)

(72) Inventors: Lili Jia, Beijing (CN); Wenjia Sun, Beijing (CN); Xiuyun Chen, Beijing (CN); Qing Ma, Beijing (CN); Daekeun Yoon, Beijing (CN)

(73) Assignees: Boe Technology Group Co., Ltd., Beijing (CN); Beijing Boe Display Technology Co., Ltd., Beijing (CN)

( * ) Notice: Subject to any disclaimer, the term of this patent is extended or adjusted under 35 U.S.C. 154(b) by 101 days.

(21) Appl. No.: 14/500,552

(22) Filed: Sep. 29, 2014

(65) Prior Publication Data

US 2015/0331171 A1 Nov. 19, 2015

(30) Foreign Application Priority Data

May 19, 2014 (CN) .......................... 2014 1 0211516

(51) Int. Cl.
| | |
|---|---|
| *F21V 8/00* | (2006.01) |
| *G02B 6/00* | (2006.01) |
| *G02F 1/1335* | (2006.01) |

(52) U.S. Cl.
CPC .................. *G02B 6/00* (2013.01); *G02B 6/009* (2013.01); *G02B 6/0031* (2013.01);
(Continued)

(58) Field of Classification Search
CPC .... G02B 6/0031; G02B 6/0085; G02B 6/0068
See application file for complete search history.

(56) References Cited

U.S. PATENT DOCUMENTS 6,419,369 B1  7/2002 Itoh
6,481,130 B1 * 11/2002 Wu .................... F21V 13/04
                                                     362/297

(Continued)

FOREIGN PATENT DOCUMENTS

CN      101281318      10/2008
CN      101749559       6/2010
(Continued)

OTHER PUBLICATIONS

Office action from Chinese Application No. 201410211516.0 dated Oct. 27, 2015.

(Continued)

*Primary Examiner* — Elmito Breval
(74) *Attorney, Agent, or Firm* — Calfee, Halter & Griswold LLP

(57) ABSTRACT

The general inventive concepts provide a side-light type backlight unit. The side-light type backlight unit comprises a light guide plate and a light source located at the side of the light incident surface of the light guide plate. The light source comprises a circuit board which comprises a first region opposite to the light incident surface of the light guide plate and a second region adjacent to the first region. The first region and the second region are provided with LED lamps. By arranging LED lamps in both the first region and the second region of the circuit board of the side-light type backlight unit, the incident light of the side-light type backlight unit is increased, thereby improving the luminance of the side-light type backlight unit in 3D state. The disclosure further provides a display device comprising such a side-light type backlight unit.

14 Claims, 4 Drawing Sheets

(52) U.S. Cl.
CPC ..... *G02B 6/0085* (2013.01); *G02F 1/133621* (2013.01); *G02B 6/0068* (2013.01)

(56) References Cited

U.S. PATENT DOCUMENTS

| | | | | |
|---|---|---|---|---|
| 6,905,214 | B2* | 6/2005 | Tani | G03B 21/208 348/E9.027 |
| 7,350,955 | B2* | 4/2008 | Chang | G02F 1/133603 349/68 |
| 8,100,573 | B2* | 1/2012 | Kim | G02B 6/0068 362/609 |
| 8,616,749 | B2* | 12/2013 | Shimizu | G02F 1/133615 362/608 |
| 2006/0262554 | A1* | 11/2006 | Mok | G02B 6/0031 362/555 |
| 2008/0055928 | A1* | 3/2008 | Arai | G02B 6/0016 362/609 |
| 2011/0292682 | A1* | 12/2011 | Yu | G02F 1/133382 362/609 |
| 2013/0051062 | A1* | 2/2013 | Lee | H05K 1/0209 362/602 |
| 2013/0051073 | A1* | 2/2013 | Park | H05K 1/0209 362/612 |
| 2013/0135538 | A1* | 5/2013 | Kuromizu | G02B 6/0031 348/790 |

FOREIGN PATENT DOCUMENTS

| | | |
|---|---|---|
| CN | 102620187 | 8/2012 |
| JP | H11212479 | 8/1999 |
| JP | 4403121 | 1/2010 |
| TW | 200540511 | 12/2005 |

OTHER PUBLICATIONS

Office action Chinese Application No. 201410211516.0 dated Feb. 24, 2016.
Office action from Chinese Application No. 201410211516.0 dated Jul. 7, 2016.

* cited by examiner

PRIOR ART

BACK LIGHT UNIT AND DISPLAY DEVICE

RELATED APPLICATIONS

The present application claims the benefit of Chinese Patent Application No. 201410211516.0, filed May 19, 2014, the entire disclosure of which is incorporated herein by reference.

FIELD

This disclosure relates to display devices, and more particularly relates to a side-light type backlight unit and a display device.

BACKGROUND

With the development of display technology and the increase of people's pursuit for entertainment, 3D display technology has caused concerns among certain segments of the display-producing market. The common principle utilized in producing 3D images is providing different images to the left eye and the right eye respectively. The methods of implementing this principle mainly include spectrophotometric methods, time division, and complementary color method.

At present, in 3D displays employing the time division method, in order to increase display quality, backlight unit (BLU) scanning is generally used to drive the 3D display, and a two-short side backlight unit operates in cooperation with the BLU scanning so as to reduce 3D cross talk and improve display quality. Specifically, referring to FIG. 1, a conventional side-light type backlight unit comprises a cooling plate 1', a light source 2', and a light guide plate 3' arranged above the cooling plate 1' as well as an optical film material 4', wherein the light source 2' comprises a circuit board 21' and a LED lamp 22' on the circuit board 21', the light source 2' is arranged at the side of a light incident surface 31' of the light guide plate 3', and the LED lamp 22' is arranged opposite to the light incident surface 31' of the light guide plate 3', such that the light emitted by the LED lamp 22' can reach the light guide plate 3' better, so as to provide a light source for the 3D display device. However, limited by the structure of the conventional two-short side backlight unit, BLU scanning in 3D state may result in a relatively low luminance of 3D display and influence the 3D display effect.

SUMMARY

Therefore, there exists a need for a side-light type backlight unit which has a higher luminance than the side-light type backlight unit of the prior art.

An aspect of the present disclosure provides a side-light type backlight unit. According to an embodiment, the side-light type backlight unit comprises a light guide plate and a light source located at the side of the light incident surface of the light guide plate, the light source comprises a circuit board which comprises a first region opposite to the light incident surface of the light guide plate and a second region adjacent to the first region, the first region and the second region are provided with LED lamps.

According to an embodiment, the first region and the second region are provided with a plurality of LED lamp groups, each of the LED lamp groups comprises at least one red LED lamp, at least one green LED lamp, and at least one blue LED lamp.

According to an embodiment, the side-light type backlight unit further comprises a cooling plate arranged under the light guide plate, a reflection structure opposite to the second region is arranged between the cooling plate and the light guide plate.

According to an embodiment, the reflection structure comprises a first reflection surface opposite to the second region, the first reflection surface is a plane or a curved surface.

According to an embodiment, the cooling plate comprises a transverse section parallel to the light guide plate and a longitudinal section adjacent to the circuit board, a first end of the longitudinal section is connected with the transverse section, a second end of the longitudinal section is provided with a rotating section.

According to an embodiment, a side of the rotating section facing towards the circuit board is provided with a second reflection surface.

According to an embodiment, the second reflection surface is a plane or a curved surface.

Another aspect of the present disclosure provides a display device comprising a side-light type backlight unit according to any of the above embodiments.

By arranging LED lamps in both the first region and the second region of the circuit board of the side-light type backlight unit, the amount of the incident light of the side-light type backlight unit is increased, thereby the luminance of the side-light type backlight unit in 3D state is improved.

BRIEF DESCRIPTION OF THE DRAWINGS

Several technical aspects of the present disclosure will be described in more detail below with reference to the accompanying drawings in order for those skilled in the art to be able to carry out the embodiments of present disclosure. The present disclosure may, however, be embodied in many different forms and should not be construed as limited to the exemplary embodiments set forth herein. In particular, the general inventive concepts are not intended to be limited by the various illustrative embodiments disclosed herein.

DETAILED DESCRIPTION

Various embodiments will be further described in detail in conjunction with the drawings. The embodiments described herein are provided merely for illustration and are not intended to limit the scope of the claims. Those of skill in the art will recognize that various other modifications and combinations are possible and still fall within the scope of the general inventive concepts.

Figure 1:
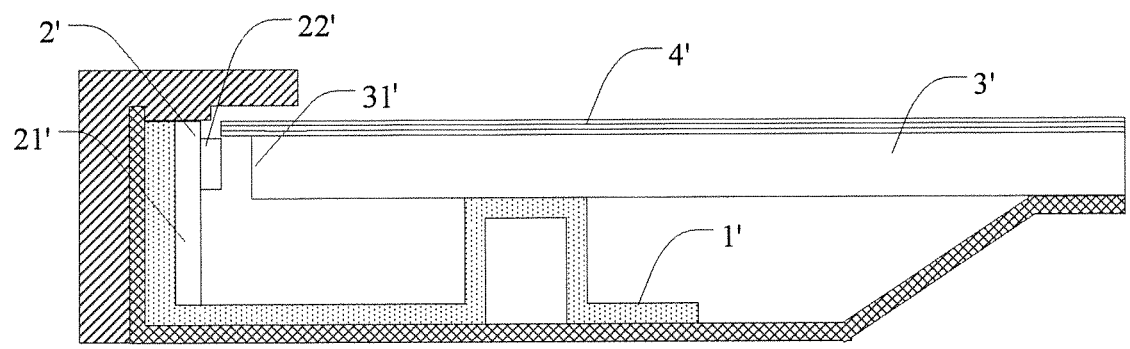
FIG. 1 is an example of a conventional side-light type backlight unit.
Figure 2:
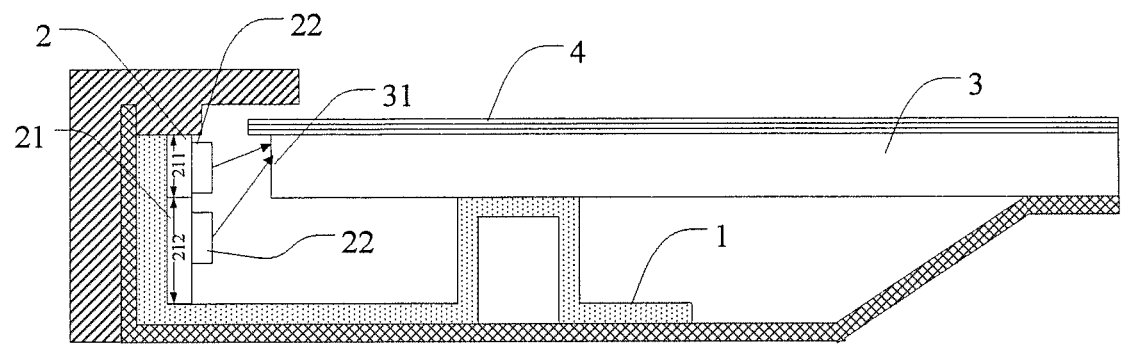
FIG. 2 is a side-light type backlight unit provided according to an exemplary embodiment.

FIG. 2 is a side-light type backlight unit provided according to an exemplary embodiment. The side-light type backlight unit comprises a light guide plate 3 and a light source 2 located at the side of the light incident surface 31 of the light guide plate 3. An optical film material 4 is arranged above the light guide plate 3. The light source 2 comprises a circuit board 21 which comprises a first region 211 opposite to the light incident surface 31 of the light guide plate and a second region 212 adjacent to the first region 211. The first region 211 and the second region 212 are provided with LED lamps.

Figure 3:
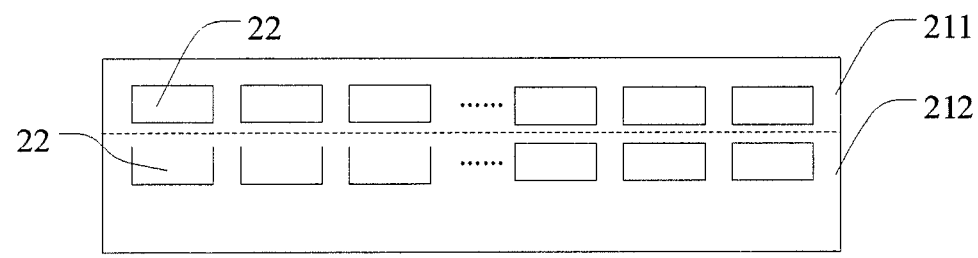
FIG. 3 is a light source provided according to an exemplary embodiment.

FIG. 3 is a light source provided according to an exemplary embodiment. The first region 211 and the second region 212 of the light source are both provided with a plurality of regularly arranged LED lamps, wherein the plurality of LED lamps may be white LED lamps or color (i.e., RGB) LED lamps.

The side-light type backlight unit provided according to an exemplary embodiment comprises a circuit board which comprises a first region opposite to the light incident surface of the light guide plate and a second region adjacent to the first region. By arranging LED lamps in both the first region and the second region, the amount of the incident light of the side-light type backlight unit is increased, thereby the luminance of the side-light type backlight unit in 3D state is improved.

Figure 4:
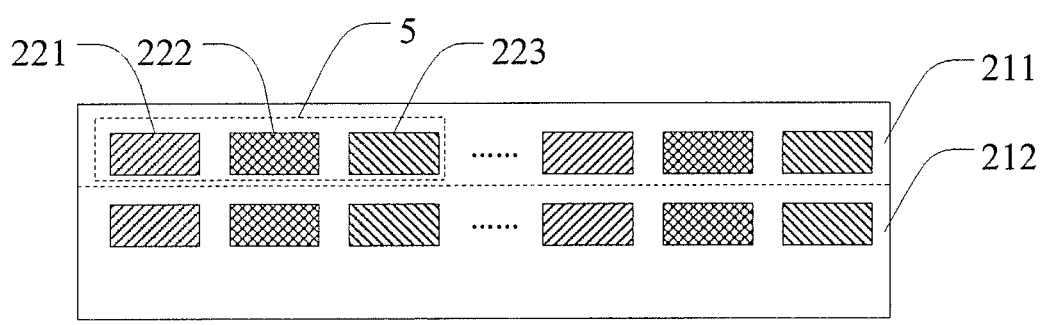
FIG. 4 is another light source provided according to an exemplary embodiment.
Figure 5:
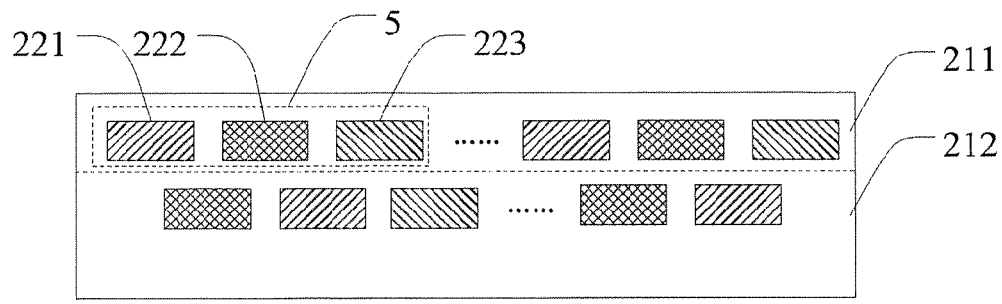
FIG. 5 is a further light source provided according to an exemplary embodiment.

In order to further increase the color gamut of the display device, the LED lamps in the above side-light type backlight unit may be color LED lamps. Referring to FIG. 4 and FIG. 5, a plurality of LED lamp groups 5 are arranged in the first region 211 and the second region 212 respectively. Each of the LED lamp groups 5 includes a red LED lamp 221, a green LED lamp 222, and a blue LED lamp 223. The red LED lamp 221, the green LED lamp 222, and the blue LED lamp 223 in each of the LED lamp groups 5 can be arranged in a variety of fashions. For example, the structure of two rows of LED lamps as shown in FIG. 4 and FIG. 5 can be formed on the circuit board. The first row of the LED lamps is located in the first region 211, the second row of the LED lamps is located in the second region 212, and each row includes a plurality of LED lamp groups.

Figure 6:
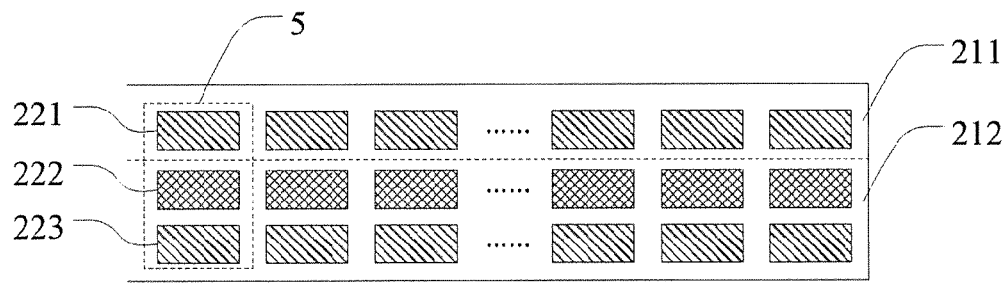
FIG. 6 is yet another light source provided according to an embodiment.

It is intended that the circuit board may include more than 2 rows of LED lamps as well. Referring to FIG. 6, three rows of LED lamps are formed on the circuit board, wherein the LED lamps in the first row are all red LED lamps and located in the first region 211, the LED lamps in the second row are all green LED lamps, the LED lamps in the third row are all blue LED lamps, such that each column of LED lamps includes a red LED lamp, a green LED lamp and a blue LED lamp, thereby forming a LED lamp group. In this way, not only is the amount of the incident light of the side-light type backlight unit further increased, but also the color gamut of emitting light of the side-light type backlight unit can be improved.

Figure 7:
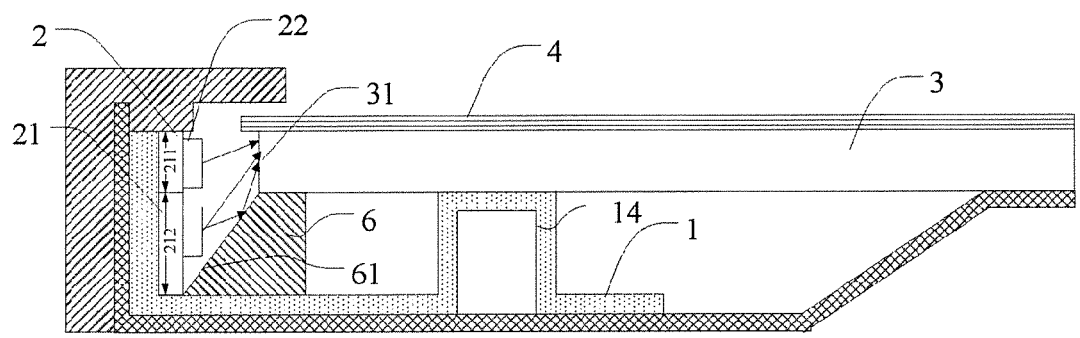
FIG. 7 is another side-light type backlight unit provided according to an exemplary embodiment.

FIG. 7 is another side-light type backlight unit provided according to an embodiment. The side-light type backlight unit comprises a light guide plate 3 and a light source 2 located at the side of a light incident surface 31 of the light guide plate 3. An optical film material 4 is arranged above the light guide plate 3. The light source 2 comprises a circuit board 21 which comprises a first region 211 opposite to the light incident surface 31 of the light guide plate and a second region 212 adjacent to the first region 211. The first region 211 and the second region 212 are provided with LED lamps. The side-light type backlight unit further comprises a cooling plate 1 arranged under the light guide plate 3. A reflection structure 6 opposite to the second region 212 is arranged between the cooling plate 1 and the light guide plate 3. The reflection structure 6 can reflect the light emitted by the LED lamps on the circuit board to the light incident surface of the light guide plate 3, thereby further increasing the amount of incident light on the light incident surface of the light guide plate and improving the display quality of the display device.

Figure 8:
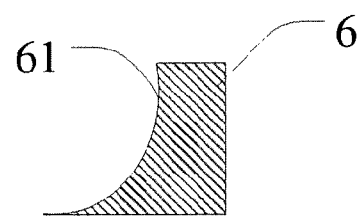
FIG. 8 a reflection structure provided according to an exemplary embodiment.

Specifically, the reflection structure 6 comprises a first reflection surface 61 opposite to the second region 212. The light emitted by the LED lamps can be reflected to the light incident surface of the light guide plate 3 by the first reflection surface. The first reflection surface 61 can be a plane as shown in FIG. 7 or a curved surface as shown in FIG. 8.

Figure 9:
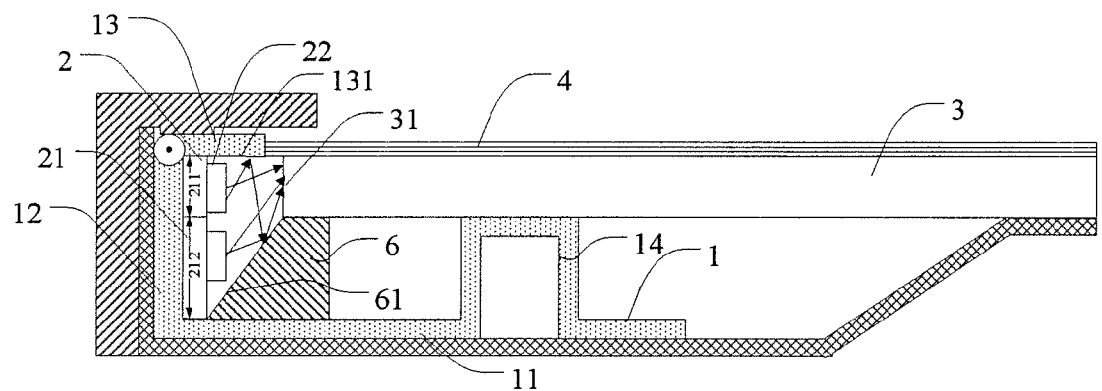
FIG. 9 is a further side-light type backlight unit provided according to an exemplary embodiment.

FIG. 9 is a further side-light type backlight unit provided according to an embodiment. The side-light type backlight unit comprises a light guide plate 3 and a light source 2 located at the side of a light incident surface 31 of the light guide plate 3. An optical film material 4 is arranged above the light guide plate 3. The light source 2 comprises a circuit board 21 which comprises a first region 211 opposite to the light incident surface 31 of the light guide plate and a second region 212 adjacent to the first region 211. The first region 211 and the second region 212 are provided with LED lamps. The side-light type backlight unit further comprises a cooling plate 1 arranged under the light guide plate 3. A reflection structure 6 opposite to the second region 212 is arranged between the cooling plate 1 and the light guide plate 3. The cooling plate 1 comprises a transverse section 11 parallel to the light guide plate 3 and a longitudinal section 12 adjacent to the circuit board 21. A first end of the longitudinal section 12 is connected with the transverse section 11. A second end of the longitudinal section 12 is provided with a rotating section 13.

Figure 10:
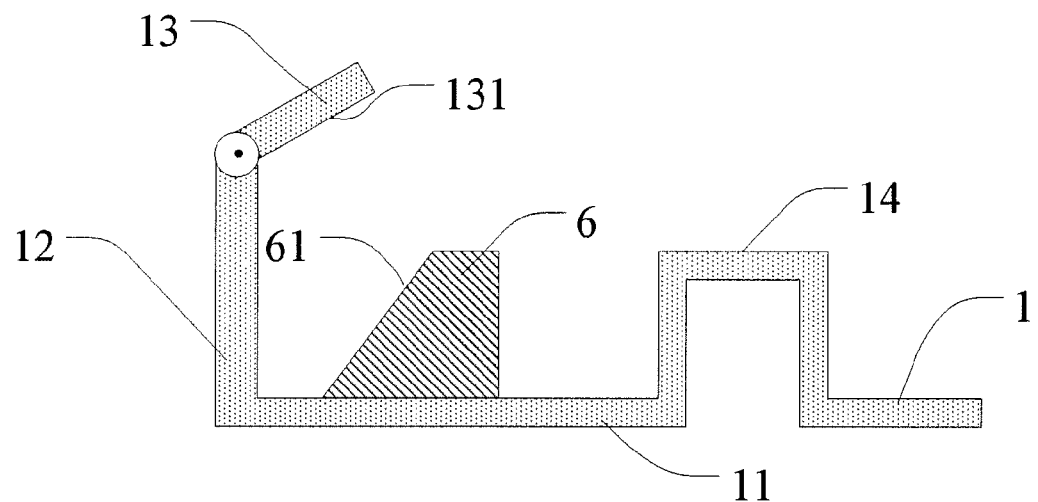
FIG. 10 is a cooling plate provided according to an exemplary embodiment.

In the above embodiment, by arranging the rotating section on the cooling plate, as shown in FIG. 10, the light source in the side-light type backlight unit can be more easily assembled, thereby improving the efficiency of producing the side-light type backlight unit.

In order to further increase the ratio of light utilized by the LED lamps on the circuit board, a second reflection surface 131 can be arranged on a surface of the rotating section 13 facing towards the circuit board 21. With the second reflection surface 131, the light emitted by the LED lamps that is incident on the second reflection surface can be reflected to the light incident surface of the light guide plate, thereby further increasing the amount of incident light on the light incident surface of the light guide plate. The second reflection surface 131 may be a plane or a curved surface.

The cooling plate 1 not only provides a cooling function to the backlight unit, but also can play a supporting function to the light guide plate 3 via a raised portion 14 thereon. The present disclosure makes full use of the gap between the cooling plate and the light guide plate. In particular, a reflection structure is arranged between the cooling plate and the light guide plate. In addition, LED lamps are arranged in a region on the circuit board opposite to the reflection structure. Thereby, the amount of incident light on the light incident surface of the light guide plate is increased, improving the display quality of the display device.

The side-light type backlight unit provided according to an embodiment comprises a circuit board which comprises a first region opposite to the light incident surface of the light guide plate and a second region adjacent to the first region. By arranging LED lamps in both the first region and the second region, the amount of the incident light of the side-light type backlight unit is increased, thereby the luminance of the side-light type backlight unit while in a 3D state is improved. Meanwhile, an ultrathin backlight unit structure with a high luminance and a high color gamut can be realized by arranging the LED lamps on the circuit board in a tricolor LED arrangement of R (red), G (green), and B (blue). In addition, adding a rotation structure on the cooling plate can facilitate the assembly of the lamp groups and improve the efficiency of producing the backlight unit. Moreover, forming a reflection surface on the corresponding surface of the rotation structure can further increase the amount of incident light on the light incident surface of the light guide plate and improve the display quality of the display device.

In addition, the general inventive concepts include a display device comprising the above side-light type backlight unit. The display device may be any product or component with a display function such as a notebook computer display screen, an electronic paper, an organic light emitting diode display, a liquid crystal display, a liquid crystal television, a digital photo frame, a mobile phone, a tablet computer etc.

Although the present disclosure has been described with reference to specific embodiments, it should be understood that the limitations of the described embodiments are provided merely for purpose of illustration and are not intended to limit the present invention and associated general inventive concepts. Instead, the scope of the present invention is defined by the appended claims, and all variations and equivalents that fall within the range of the claims are intended to be embraced therein. Thus, other embodiments than the specific exemplary ones described herein are equally possible within the scope of these appended claims.

The invention claimed is:

1. A side-light type back light unit, comprising
a light guide plate and a light source located adjacent to the light incident surface of the light guide plate,
the light source comprising a circuit board which comprises a first region opposite to the light incident surface of the light guide plate and a second region adjacent to the first region, the first region and the second region comprising at least one LED lamp,
a cooling plate arranged under the light guide plate, and
a reflection structure opposite to the second region arranged between the cooling plate and the light guide plate,
wherein the reflection structure comprises a first reflection surface opposite to the second region, for reflecting the light emitted by the LED lamps provided on the second region to the light incident surface of the light guide plate.

2. The side-light type back light unit according to claim 1, wherein the first reflection surface is a plane or a curved surface.

3. The side-light type back light unit according to claim 1, wherein the cooling plate comprises a transverse section parallel to the light guide plate and a longitudinal section adjacent to the circuit board, a first end of the longitudinal section is connected with the transverse section, a second end of the longitudinal section is provided with a rotating section.

4. The side-light type back light unit according to claim 3, wherein a surface of the rotating section facing towards the circuit board is provided with a second reflection surface.

5. The side-light type back light unit according to claim 4, wherein the second reflection surface is a plane or a curved surface.

6. The side-light type back light unit according to claim 1, wherein the first region and the second region are provided with a plurality of LED lamp groups, each of the LED lamp groups comprise a red LED lamp, a green LED lamp, and a blue LED lamp.

7. The side-light type back light unit according to claim 6, further comprising a cooling plate arranged under the light guide plate, wherein a reflection structure opposite to the second region is arranged between the cooling plate and the light guide plate.

8. A display device, comprising a side-light type back light unit according to claim 1.

9. The display device according to claim 8, wherein the first reflection surface is a plane or a curved surface.

10. The display device according to claim 8, wherein the cooling plate comprises a transverse section parallel to the light guide plate and a longitudinal section adjacent to the circuit board, a first end of the longitudinal section is connected with the transverse section, and a second end of the longitudinal section is provided with a rotating section.

11. The display device according to claim 10, wherein a surface of the rotating section facing towards the circuit board is provided with a second reflection surface.

12. The display device according to claim 11, wherein the second reflection surface is a plane or a curved surface.

13. The display device according to claim 8, wherein the first region and the second region are provided with a plurality of LED lamp groups, each of the LED lamp groups comprise a red LED lamp, a green LED lamp, and a blue LED lamp.

14. The display device according to claim 13, wherein the side-light type back light unit further comprises a cooling plate arranged under the light guide plate, wherein a reflection structure opposite to the second region is arranged between the cooling plate and the light guide plate.

* * * * *